United States Patent [19]
Stähle et al.

[11] 3,945,259
[45] Mar. 23, 1976

[54] VIBRATION GENERATOR
[75] Inventors: Eugen Stähle, Magstadt; Karl Frauhammer, Musberg, both of Germany
[73] Assignee: Robert Bosch GmbH, Stuttgart, Germany
[22] Filed: Oct. 15, 1974
[21] Appl. No.: 515,005

[30] Foreign Application Priority Data
Oct. 12, 1973   Germany............................ 2351241

[52] U.S. Cl. ................ 74/61; 310/81; 259/DIG. 42
[51] Int. Cl.²........................................ F16H 33/00
[58] Field of Search ........... 310/81, 66, 273, 47, 50, 310/DIG. 1; 128/34–37; 318/114, 128; 209/127, 127 A, 127 B, 381; 74/61; 198/220 DB; 259/1, DIG. 41, DIG. 42

[56] References Cited
UNITED STATES PATENTS

| | | | |
|---|---|---|---|
| 1,885,575 | 11/1932 | Blanks .................................. | 128/36 |
| 2,198,872 | 4/1940 | Hegstrom............................. | 128/36 |
| 2,892,108 | 6/1959 | Moxley................................. | 128/36 |
| 2,972,688 | 2/1961 | Mahlfeldt............................. | 310/81 |
| 3,396,294 | 8/1968 | Makino................................ | 310/66 |
| 3,672,355 | 6/1972 | Ogawa................................. | 128/36 |
| 3,792,617 | 2/1974 | Strasser....................... | 259/DIG. 42 |

FOREIGN PATENTS OR APPLICATIONS
1,285,777   12/1968   Germany .............................. 74/61

Primary Examiner—R. Skudy
Attorney, Agent, or Firm—Michael J. Striker

[57]               ABSTRACT

A motor of a vibration generator has a rotary output shaft whose revolutions are variable and include a range of revolutions having a lower and an upper limit. A first element constitutes a first imbalanced mass and is fixedly mounted on the output shaft for rotation with the same. A second C-shaped element constitutes a second imbalanced mass and straddles the first element and the output shaft, being displaceable relative thereto under the influence of centrifugal force in direction substantially radially outwardly away from the shaft to a series of positions in each of which the generator produces usable vibrations of a different magnitude. Elastomeric bodies are interposed between and connect the first and second elements with one another, serving to yieldably restrain the second element against displacement to the positions of the aforementioned series while the revolutions of the output shaft are below the lower limit of the range of revolutions.

25 Claims, 7 Drawing Figures

VIBRATION GENERATOR

BACKGROUND OF THE INVENTION

The present invention relates generally to a vibration generator and more particularly to a vibration generator which is especially, but not exclusively, suitable for use with vibratory conveyors and vibratory screens.

It is known to provide vibration generators of this general type where a first imbalanced mass is mounted on the output shaft of a motor for rotation with this output shaft, and a second imbalanced mass rotates with the first mass and is shiftable radially away from the output shaft under the influence of centrifugal force and against the force of prestressed springs. Both the first and the second imbalanced mass are in form of relatively massive steel members, and the second imbalanced mass is guided by four bolts which are strongly enough dimensioned so as to be able to reliably withstand the relatively high forces which develop in the operation of the vibration generator.

This prior-art construction has certain disadvantages. Because of the rather massive construction of the various involved components, the necessity for providing the springs and necessity for providing the guide bolts, which all also add to the total mass to be accelerated, this total mass is rather large so that the electromotor which drives the generator must overcome a large starting moment, thus making it necessary that a motor be used having a high starting torque and which is correspondingly expensive. An additional disadvantage of this prior-art construction resides in the fact that the guide bolts which guide the second imbalanced mass during its movements relative to the rotary shaft are subject to quite significant wear, so that over a period of time undesirable noises will develop during the operation of the vibration generator. Moreover, these guide bolts must of course be frequently lubricated.

SUMMARY OF THE INVENTION

It is a general object of this invention to avoid the disadvantages of the prior art.

More particularly, it is an object of this invention to provide an improved vibration generator which is particularly, but not exclusively, suitable for use in powering vibratory conveyors and screens, and which does not possess the aforementioned disadvantages.

A more particular object of the invention is to provide such a novel vibration generator which is at least equally as effective as those known from the prior art, but offers a much smaller starting moment and thus makes it possible to use a less powerful and less expensive motor.

A further object of the invention is to provide such a vibration generator which in operation is substantially less noisy than the prior-art ones.

In addition, it is an object of the invention to provide such a vibration generator which requires no lubrication.

In keeping with these objects and with others which will become apparent hereafter, one feature of the invention resides in a vibration generator, particularly for vibratory conveyors and screens, which comprises a motor having a rotary output shaft whose revolutions are variable and include a range of revolutions having a lower and an upper limit. A first element constitutes a first imbalanced mass and is fixedly mounted on the output shaft for rotation with the same. A second element constitutes a second imbalanced mass and is proximal to the first element, being displaceable relative to the same under the influence of centrifugal force in direction substantially radially outwardly from the shaft to a series of positions in each of which the generator produces usable vibrations of a different magnitude. Elastomeric means connects the elements with one another and is operative for yieldably restraining the second element against displacement to the aforementioned positions thereof while the revolutions of the output shaft are below the aforementioned lower limit.

The thus briefly characterized vibration generator of the present invention has a relatively small total mass that is to be accelerated, and therefore offers a reduced starting moment and makes it possible to employ an electromotor that can be less powerful than those required in the prior-art generators. There is no lubrication required of the moveable components at any time, and because the displaceable second element has no play during its displacement, and no guide components are provided which guide it for its movement and can be subjected to wear, the novel vibration generator operates very quietly.

It is particularly advantageous if the first element constituting the first imbalanced mass is configurated as an essentially wedge-shaped member having a tip and a rear end portion which is formed at the rearward end of its inclined wedge-shaped flanking surfaces with a bore into which the output shaft of the motor extends, and to the flanking surfaces of which there are vulcanized mirror-symmetrical rubber bodies which in turn are straddled — as are the first element and the output shaft of the motor — by the substantially C-shaped second element.

The novel features which are considered as characteristic for the inventionn are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
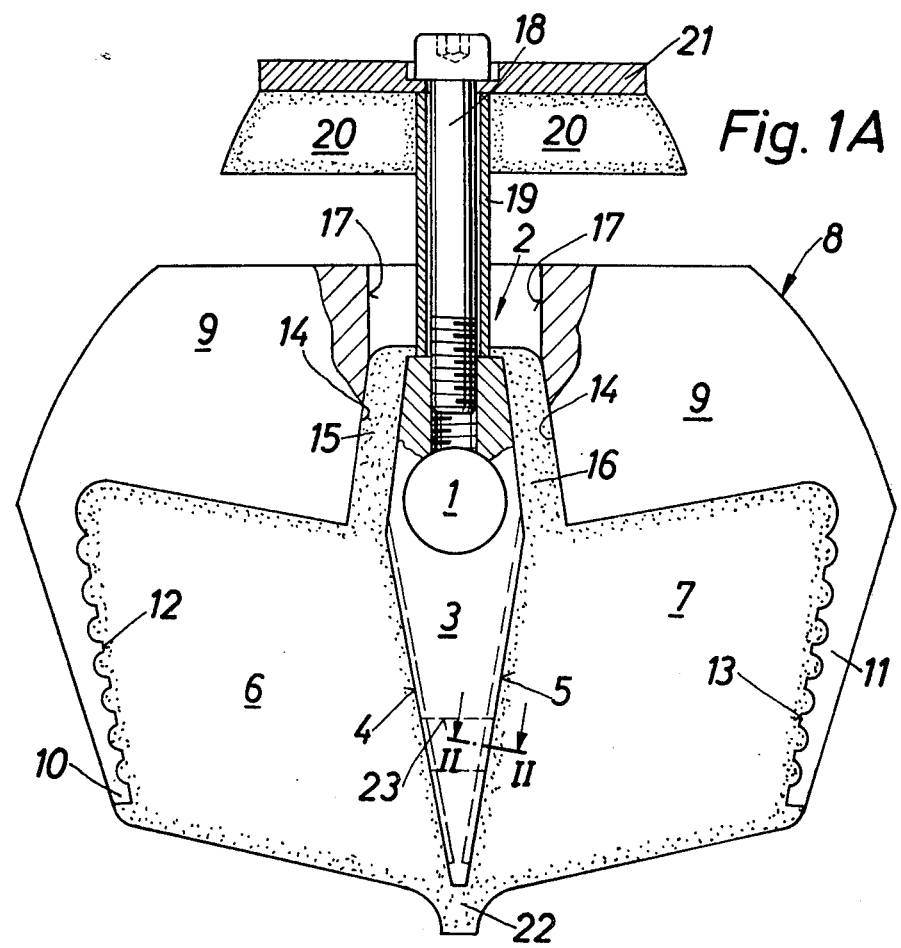
FIG. 1A is a vertical section through the vibration-producing components of the novel vibration generator according to one embodiment of the invention, showing the generator at rest.

FIGS. 1–5 illustrate one embodiment of the invention. The vibration generator according to this embodiment is driven in rotation by the diagrammatically illustrated electromotor M (FIG. 3) having the rotary output shaft 1. The electromotor may for example be an asynchronous three-phase motor. Mounted on the output shaft 1 for rotation therewith is a first imbalanced mass 2 in form of an essentially wedge-shaped first element 3. In cross-section the element 3 resembles an arrowhead or the like and it is provided with a tip and with a pair of lateral flanking surfaces 4, 5 which converge towards one another and towards the tip in the direction from a rear end portion of the element 3. The surfaces 4, 5 are formed with a plurality of grooves, as suggested by the broken lines in FIG. 1A, and these grooves also extend in the direction from the rear end portion of the element 3 towards the tip thereof. This provides for an increase in the surface area of the flanking surface 4, 5 which is desirable to be able to more firmly vulcanize to these flanking surfaces 4, 5 respective elastomeric (e.g. rubber) members 6, 7. The members 6, 7 are unstressed when the device is standing still and, as shown in FIG. 1A which shows the device in that condition, the members 6, 7 approximately have the form of squares with two parallel inclined sides.

It is clear from the drawing that the members 6, 7 are arranged symmetrically with reference to one another. They, and the member 3 which is provided in the region where the flanking surfaces 4, 5 merge with the rear portion of the member 3 or their bore extending transversely to the member 3 and wherein the shaft 1 is anchored, are straddled by a second imbalanced mass 8 in the form of an essentially plate-shaped member 9 having a more or less C-shaped configuration. The element 3 and the members 6, 7 are located in the cutout of the C-shaped element 9 and are bounded at the lateral sides by arms 10, 11 of the element 9. The arms 10, 11 converge towards one another in the direction of the tip of the element 3 and have inwardly facing surfaces 12, 13 which are also in engagement with and vulcanized to the members 6, 7. The surfaces 12, 13 are also provided with waves or grooves, that is they are corrugated just as the flanking surfaces 4, 5 except that the corrugations on the surfaces 12, 13 extend in substantial parallelism with the axis of rotation of the shaft 1, that is substantially normal to the elongation of the corrugations on the flanking surfaces 4, 5. The purpose of the corrugations on the surfaces 12, 13 is the same as of those on the flanking surfaces 4, 5, namely to increase the available surface area to which the members 6, 7 can be vulcanized.

The element 9 is further provided with a groove-like central channel 14 into which the rear end portion of the element 3 extends centrally and with spacing. The side faces bounding the channel 14 are slightly inclined so that the channel 14 diverges somewhat in the direction towards the tip of the element 3, and the rear end portion of the element 3 which is located intermediate these side faces of the channel 14 has outer surfaces having an inclination similar to that of the surfaces of the channel 14 with which they are juxtaposed. The gaps which thus exist between the faces bounding the passage 14 and the outer side faces of the rear end portion of the element 3 are filled by extensions 15, 16 of the members 6, 7, as long as the generator is in stationary position. It should be noted that while there is engagement between the extensions 15, 16 and the inwardly facing surfaces bounding the passage 14, there is no bond or other connection between them so that they can become disengaged when the generator is in operation, as shown in FIG. 1B.

It is advantageous that the element 3 be made of aluminum to thereby reduce its weight and the required starting moment for the motor M, whereas the element 9 having the arms 10, 11 is advantageously of steel.

The rear end portion of the element 3 is formed with a tapped bore into which there is threaded a cylinder head screw 18 which passes through a bore 17 of the element 9 that is large enough to afford clearance. A sleeve 19 is provided and the screw 18 is drawn down and tensioned against the sleeve 19. The screw 18 holds an abutment 21 which is preferably provided with a member 20 of cushioning material, such as synthetic plastic foam material or the like, and the purpose of the members 20 and 21 is to limit the possibility of radial displacement of the element 9 relative to the shaft 1, as indicated in FIG. 1B which illustrates the device of FIG. 1A in the condition which the various elements will assume when the shaft 1 rotates at the highest operational speed. Because of the engagement of the member 20 with the element 9, the member 20 is resiliently deformed as shown in FIG. 1B.

Figure 2:
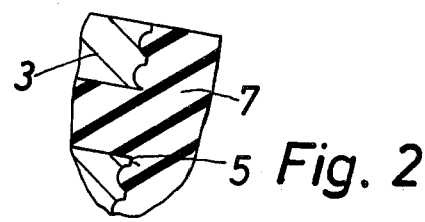
FIG. 2 is a section taken on line II—II of FIG. 1A.

The members 6, 7 are connected with one another by a strip or portion 22 which is advantageously of one-piece with them and which extends about the tip of the element 3. The element 3 is provided with a plurality of transverse bores 23 which are filled by the material of the members 6, 7, as indicated in FIG. 2.

Figure 4:
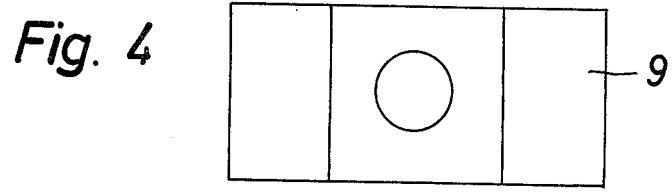
FIG. 4 is a top-plan view of one of the elements in FIG. 1A.
Figure 5:
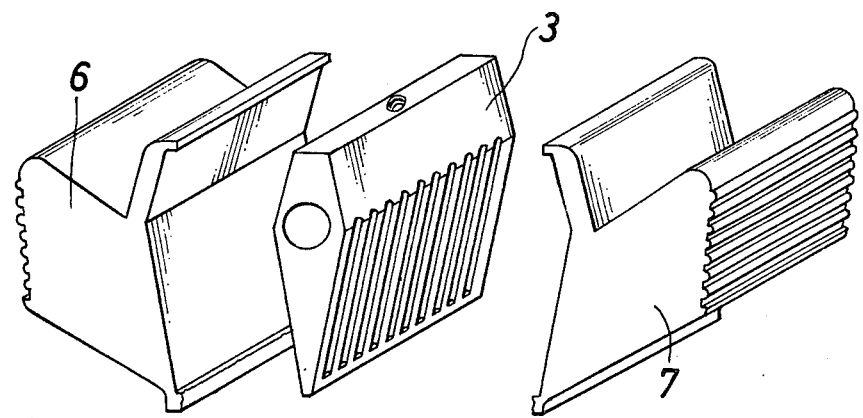
FIG. 5 is a perspective view of three other of the elements in FIG. 1A.

For better understanding FIG. 4 shows a top-plan view of the element 9, FIG. 5 a perspective view of the elements 3, 6, 7.

Figure 1B:
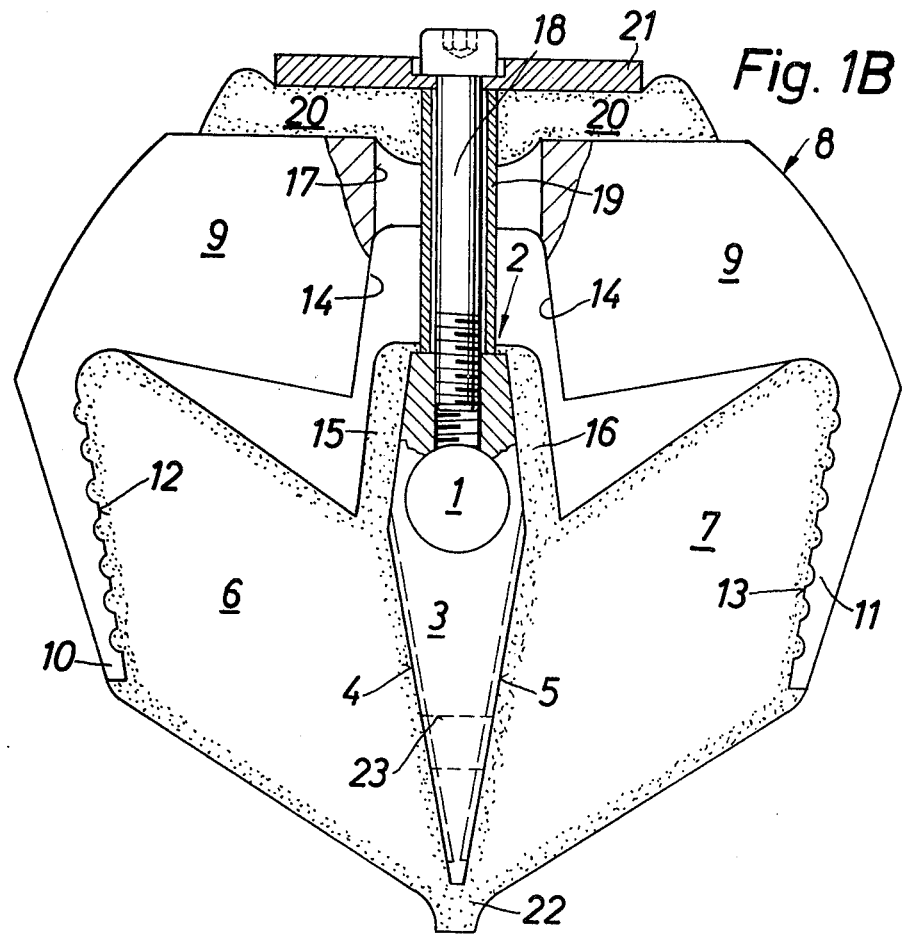
FIG. 1B is a view similar to FIG. 1A, but showing the vibration generator rotating at maximum speed.
Figure 3:
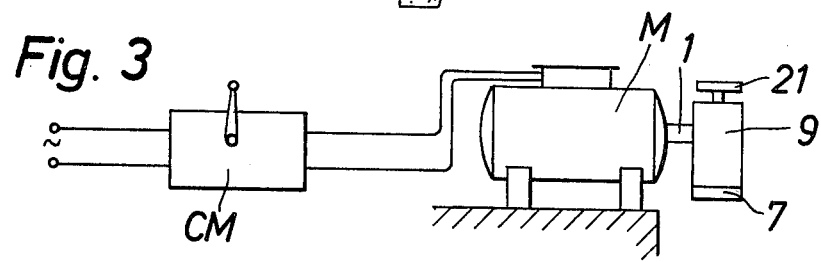
FIG. 3 is a diagrammatic side view of the generator in FIG. 1A, showing a drive motor and a control device for the same.

When the device of FIGS. 1–5 stands still, that is when the shaft 1 is not turning so that the device is in the position shown in FIG. 1A, the common center of gravity of the element 9 and of the members 6, 7 is located outwardly spaced from the axis of rotation of the shaft 1 on the symmetry axis of the device. As soon as the electromotor M is energized and the shaft 1 begins to turn, a centrifugal force acting upon this common center of gravity begins to shift the element 9 radially outwardly. As this takes place, the members 6, 7 are subject to thrust forces and also, because of the wedge-shaped configuration of the element 3 and the fact that the inner surfaces 12, 13 extend in parallelism with the flanking surfaces 4, 5, also to a certain amount of pressure. As a result of this, the members 6, 7 deform and exert sufficient restraining force upon the element 9 to maintain the latter in a radial position relative to the shaft 1 — until such time as the lower limit of the range of revolutions of the adjustable motor M has been reached — in which the vibrations and accelerations produced by the imbalanced masses 2, 4 are below the level of 1 g (1 gravity) which is necessary to produce vibrations that are usable in the sense that they will operate such components as vibratory conveyors or the like. When the number of revolutions of the shaft 1 reaches or moves upwardly beyond this aforementioned lower limit, the accelerations produced by the imbalanced masses exceed the 1 g value, so that now usable vibrations are being produced.

Since for every number of revolutions of the device within the range of revolutions within which the output shaft 1 and the motor M can be adjusted, a balance will develop between the restraining force exerted upon the element 9 by the members 6, 7 and on the other hand the centrifugal force developed by the element 9, different numbers of revolutions within the aforementioned range of revolutions will produce a different radially outward spacing of the element 9 relative to the axis of rotation of the shaft 1, and, hence, a different magnitude of vibration. The maximum number of revolutions, and hence the maximum vibrations that can be produced, are developed when the element 9 has assumed the position illustrated in FIG. 1B in which it engages the cushioning member 20 on the abutment 21.

The purpose of the extensions 15, 16 is to dampen or even make impossible transverse vibrations, noises and possibly damage which might occur otherwise during starting-up and braking of the device according to the invention. The purpose of the portion 22 which connects the members 6, 7 is to prevent the development of hairline cracks where the members 6, 7 are vulcanized to the tip of the element 3. In the absence of the portion 22 such hair-line cracks might otherwise occur because of stresses developing in that area, leading to a separation of the members 6, 7 from the flanking surfaces 4, 5 of the element 3 and to a decrease in the lifetime of the device.

The screw 18 is advantageously somewhat yieldable in its longitudinal direction and therefore can be of lightweight construction, being capable of yieldably absorbing stresses resulting from engagement of the element 9 with the abutment 21. This lightweight construction contributes to the possibility of making the element 3 of small weight, and a small moment of imbalance.

The transverse bores or passages 23 in the element 3 evidently improve the firmness of connection of the members 6, 7 with the element 3, since the material of the members 6, 7 (which might be formed in liquid state while the element 3 is immersed into the liquid material to facilitate the penetration thereof into the bores 23) enters into these bores. On the other hand, the bores 23 have also been found to be very advantageous during such manufacture and vulcanization since the not yet fully vulcanized rubber mass of the members 6, 7 which is subject to significant pressure can flow through the bores 23 from one to the other side of the element 3 so that a pressure equalization will occur between the spaces in which the members 6 and 7 are being formed.

Figure 6:
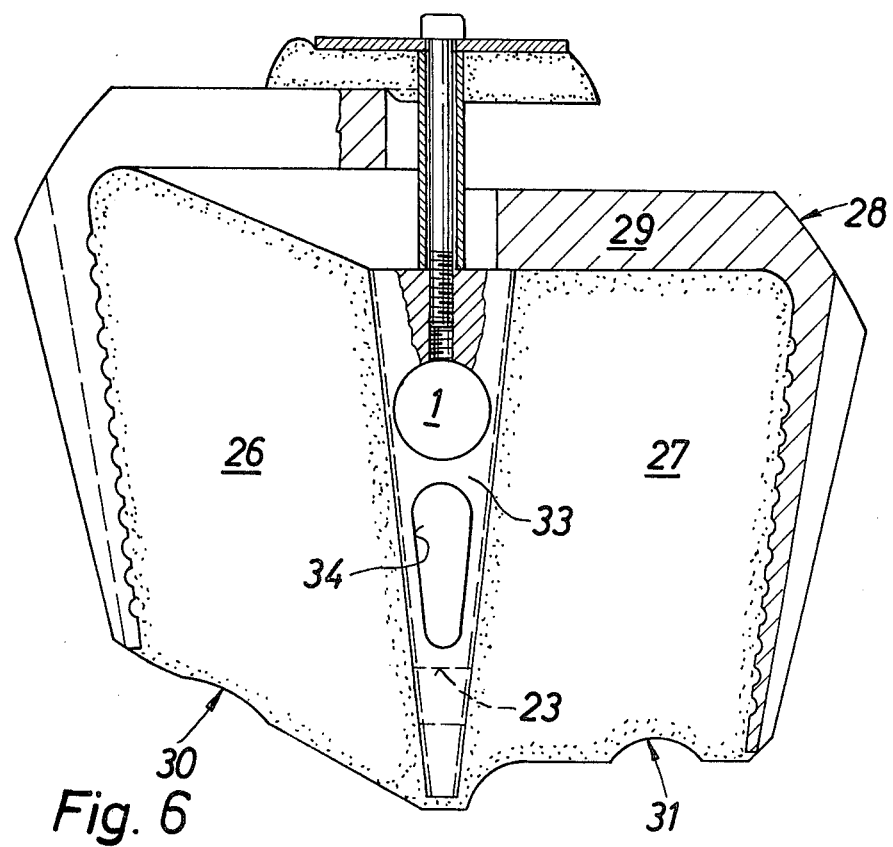
FIG. 6 is a view analogous to FIG. 1A, but illustrating a different embodiment of the invention and showing that embodiment in rest position at the right-hand side of FIG. 7, and in a condition of maximum rotational speed at the left-hand side of that Figure.

FIG. 6, finally, shows a further embodiment of the invention which essentially corresponds to the embodiment in FIGS. 1–5. Since the basic construction of the novel generator will already be readily understood from FIGS. 1–5, FIG. 6 combines the showings of FIGS. 1A and 1B in a single Figure, showing at the right-hand side the condition of the device when it is at rest, and at the left-hand side the condition of the device when it is being rotated at maximum revolutions.

The embodiment of FIG. 6 is constructed for a substantially greater range of usable vibrations, and hence the mass ratios are different as compared to the embodiment of FIGS. 1–5. The second imbalanced mass is here identified with reference numeral 28 and in form of a substantially plate-shaped element 29. Particularly the thickness of the element 29 is substantially smaller than its other dimensions, by comparison with the element 9 in FIGS. 1–5. By contrast, the mass and dimensions of the elastomeric (e.g. rubber) members 26, 27 is substantially greater than that of the members 6, 7 in FIGS. 1–5. In addition, the members 26, 27 are formed on their free edge faces which are remote from the closed side of the cut-out in the element 29, with a pair of grooves of semi-circular cross-section which are identified with reference numerals 30 and 31 and are located at opposite sides of the tip of the first imbalanced mass 3. The purpose of the grooves or kerfs 30, 31 which extend parallel to the axis of rotation of the shaft 1, is to serve as a relief for stresses which occur at the free edges of the members 26, 27. It will be appreciated that the kerfs 30, 31 have the cross-sectional configuration shown for the kerf 31 when the device is standing still, but will due to the deformation of the members 26, 27 assume the configuration shown for the kerf 30 (left-hand side of FIG. 6) when the device rotates at maximum revolutions. To obtain a desired mass ratio, material can be removed from the second imbalanced mass 33 by forming a relief bore 34 therein, for example of the essentially oval configuration that is illustrated. In all other respects, the embodiment of FIG. 6 corresponds to that of FIGS. 1–5.

It is particularly advantageous if two pairs of the first and second imbalanced masses are mounted on one and the same output shaft of an electromotor, because this increases the effectiveness of the vibration generator In such a case it has been found advantageous in terms of regulating the revolutions of the motor if an electronic control device is used to control the operation of the motor M. Such a control device is well known in the art and is diagrammatically illustrated in FIG. 3 where it is designated with reference characters CM. This control device will have an arrangement which upon energization of the electromotor M will automatically and for a brief period of time increase the applied voltage to the maximum value of, for example 380 volts. The purpose of this is to obtain a reliable synchronization of the two sets of imbalanced masses each composed of a first and a second imbalanced mass. This reliably prevents the possibility that the two sets might become synchronized in their operation at a 90° offset rather than a 180° offset, which would lead to the development of vibrations acting in a direction transverse to the direction in which they are intended to act.

It will be understood that each of the elements described above, or two or more together, may also find a useful application in other types of constructions differing from the types described above.

While the invention has been illustrated and described as embodied in a vibration generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Vibration generator, particularly for vibratory cconveyors and screens, comprising a shaft having an axis; means for rotating said shaft about said axis at variable angular speeds within a lower and a higher range of speeds and including a motor; a first element fixedly mounted on said shaft for rotation therewith and imbalanced with respect to said axis; a second element also imbalanced with respect to said axis and displaceable substantially radially outwardly from said shaft and proximally to said first element under the influence of centrifugal forces to a series of positions in each of which said generator produces vibrations of a different magnitude; and elastomeric means for connecting said elements with one another and for yieldably restraining said second element against displacement to said positions while the angular speed of said shaft is within said lower range.

2. Vibration generator as defined in claim 1, wherein said elastomeric means comprises at least one rubber body.

3. Vibration generator as defined in claim 1, wherein said motor is an asynchronous three-phase motor.

4. Vibration generator as defined in claim 1, wherein said elastomeric means is in unstressed condition when said output shaft is standing still.

5. Vibration generator as defined in claim 1, wherein said first element is an elongated wedge-shaped body having a tip and an end portion remote from said tip, said end portion being provided with a bore in which said shaft is received and said wedge-shaped body having flanking surfaces which converge from said end portion towards said tip.

6. Vibration generator as defined in claim 5, wherein said second element is of substantially C-shaped outline and formed with a cut-out which straddles said shaft and wherein first element is received with clearance.

7. Vibration generator as defined in claim 1; further comprising fastener means threaded into said first element and projecting transversely from said shaft; and abutment means carried by said fastener means spaced from said shaft and first element and positioned for engaging said second element and limiting the displacement of the latter to prevent such displacement beyond the positions of said series.

8. Vibration generator as defined in claim 1, wherein said second element is formed with a cutout in which said first element and elastomeric means are substantially received so as to be straddled by said second element; and wherein said elastomeric means has an edge region located at an open side of said cutout and formed with at least one kerf of semi-circular cross-section which extends substantially parallel to the axis of rotation of said shaft.

9. Vibration generator as defined in claim 1, wherein said second element and said elastomeric means have a common center of gravity when said shaft is standing still, and wherein said common center of gravity is outwardly spaced from said shaft.

10. Vibration generator as defined in claim 1, wherein said first element is of aluminum and said second element is of steel.

11. Vibration generator as defined in claim 1, wherein said motor is an asynchronous three-phase motor having at a maximum nominal voltage when said shaft is to perform maximum revolutions; and further comprising electronic control means for briefly operating said motor at said maximum voltage in automatic response to energization of said motor.

12. Vibration generator, particularly for vibratory conveyors and screens, comprising a motor having a rotary output shaft whose revolutions are variable and include a range of revolutions having a lower and an upper limit; a first element, constituting a first imbalanced mass, fixedly mounted on said output shaft for rotation therewith and including an elongated wedge-shaped body having a tip and an end portion remote from said tip said end portion being provided with a bore in which said output shaft is received and said wedge-shaped body having flanking surfaces which converge from said end portion toward said tip; a second element, constituting a second imbalanced mass, proximal to said first element and being displaceable relative to the same under the influence of centrifugal forces in direction substantially radially outwardly from said shaft to a series of positions in each of which said generator produces usable vibrations of a different magnitude, said second element being of substantially C-shaped outline and formed with cut-out which straddles said output shaft and in which said first element is received with clearance; and elastomeric means connecting said elements with one another and operative for yieldably restraining said second element against displacement to said positions while the revolutions of said output shaft are below said lower limit.

13. Vibration generator as defined in claim 12, wherein said elastomeric means comprises a pair of elastomeric members which are mirror-symmetrical with reference to one another and received in said clearance at diametrically opposite sides of said first element, said elastomeric members each being vulcanized to one of said flanking surfaces and embraced by said second element.

14. Vibration generator as defined in claim 13, wherein said second element is substantially plate-shaped and has a pair of arms partially bounding said cut-out and each having an inwardly directed face, said faces being inclined towards one another in direction towards said tip and each extending parallel to one of said flanking surfaces; and wherein each of said elastomeric members is also vulcanized to a respectively adjacent one of said faces.

15. Vibration generator as defined in claim 14, wherein said second element has a transverse portion extending across an inner closed end of said cut-out and formed with a central passage which communicates with said cut-out and is bounded by side faces; and wherein said end portion is centrally located with spacing in said passage and has outer faces which each parallel one of said side faces.

16. Vibration generator as defined in claim 15, wherein said elastomeric members include portions which extend into and fill the space between said outer faces and side faces.

17. Vibration generator as defined in claim 14, wherein said flanking surfaces and said inwardly directed faces are formed with wavy corrugations.

18. Vibration generator as defined in claim 17, wherein the corrugations on said inwardly directed faces extend parallel to the axis of rotation of said shaft, and the corrugations on said flanking surfaces extend normal to the axis of rotation of said shaft.

19. Vibration generator as defined in claim 13, wherein said elastomeric means further comprises a strip of elastomeric material of one piece with both of said elastomeric members and overlying said tip of said first element.

20. Vibration generator as defined in claim 13, wherein said first element is formed with passages extending inwardly of the respective flanking surfaces, and wherein said passages are at least partly filled with 21. Vibration generator, particularly for vibratory conveyors and screens, comprising a motor having a rotary output shaft whose revolutions are variable and include a range of revolutions having a lower and an upper limit; a first elment, constituting a first imbalanced mass, fixedly mounted on said output shaft for rotation therewith; a second element, constituting a second imbalanced mass, proximal to said first element and being displaceable relative to the same under the influence of centrifugal forces in direction substantially radially outwardly from said shaft to a series of positions in each of which said generator produces usable vibration of a different magnitude; elastomeric means connecting said elements with one another and operative for yieldably restraining said second element against displacement to said positions while the revolutions of said output shaft are below said lower limit; fastener means threaded into said first element and projecting transversely from said shaft; and abutment means carried by said fastener means spaced from said shaft and first element and positioned for engaging said second element and limiting the displacement of the latter to prevent such displacement beyond the positions of said series.

22. Vibration generator as defined in claim 21, said abutment means comprising a cushioning portion positioned for engagement by said second element so as to cushion such engagement.

23. Vibration generator as defined in claim 21, wherein said fastener means comprises a sleeve extending from and abutting said first element, and a screw threaded through said sleeve into said first element.

24. Vibration generator, particularly for vibratory conveyors and screens, comprising a motor having a rotary output shaft whose revolutions are variable and include a range of revolutions having a lower and an upper limit; a first element, constituting a first imbalanced mass, fixedly mounted on said output shaft for rotation therewith; a second element, constituting a second imbalanced mass, formed with the cutout in which said first element is substantially received so as to be straddled by said second element proximal thereto and being displaceable relative to said first element under the influence of centrifugal forces in direction substantially radially outwardly from said shaft to a series of positions in each of which said generator produces usable vibrations of a different magnitude; and elastomeric means substantially received in said cutout and straddled by said second element and operative for connecting said elements with one another and for yieldably restraining said second element against displacement to said positions while the revolutions of said output shaft are below said lower limit, said elastomeric means having an edge region located at an open side of said cutout and formed with at least one kerf of semi-circular cross section which extends substantially paralle to the axis of rotation of said shaft.

25. Vibration generator, particularly for vibratory conveyors and screens, comprising a motor having a rotary output shaft whose revolutions are variable and include a range of revolutions having a lower and an upper limit; a first element, constituting a first imbalanced mass, fixedly mounted on said output shaft for rotation therewith; a second element, constituting a second imbalanced mass, proximal to said first element and being displaceable relative to the same under the influence of centrifugal forces in direction substantially radially outwardly from said shaft to a series of positions in each of which said generator produces vibrations of a different magnitude, said second element having a center of gravity outwardly spaced from said shaft; and elastomeric means connecting said elements which one another and operative for yieldably restraining said second element against displacement to said positions while the revolution of said output shaft are below said lower limit, said elastomeric means also having a center of gravity coinciding with said center of gravity of said second element when said shaft is standing still.

* * * * *